Oct. 7, 1924.

F. LJUNGSTRÖM 1,510,895

TOOTHED GEARING

Filed Nov. 4, 1921  4 Sheets-Sheet 1

Inventor
F. Ljungström,
By Marks & Clerk
Attys.

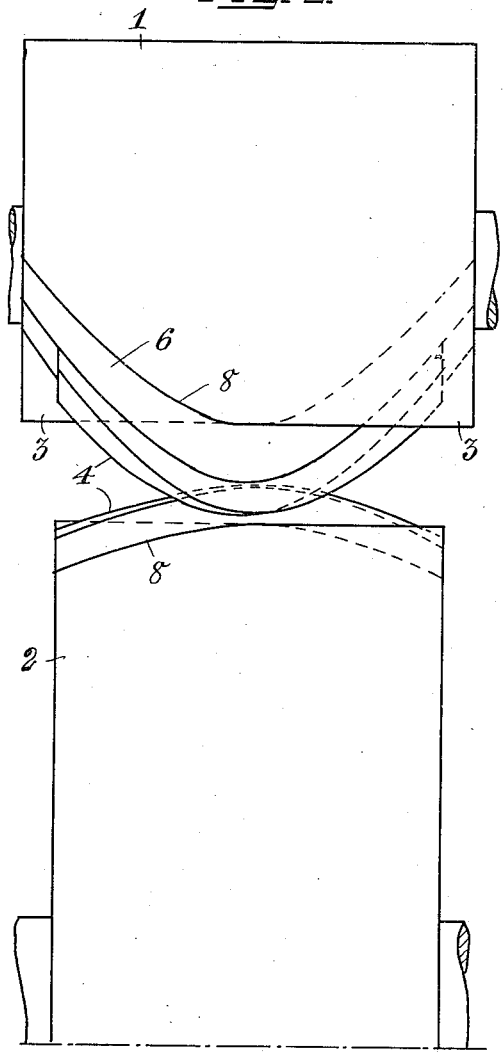
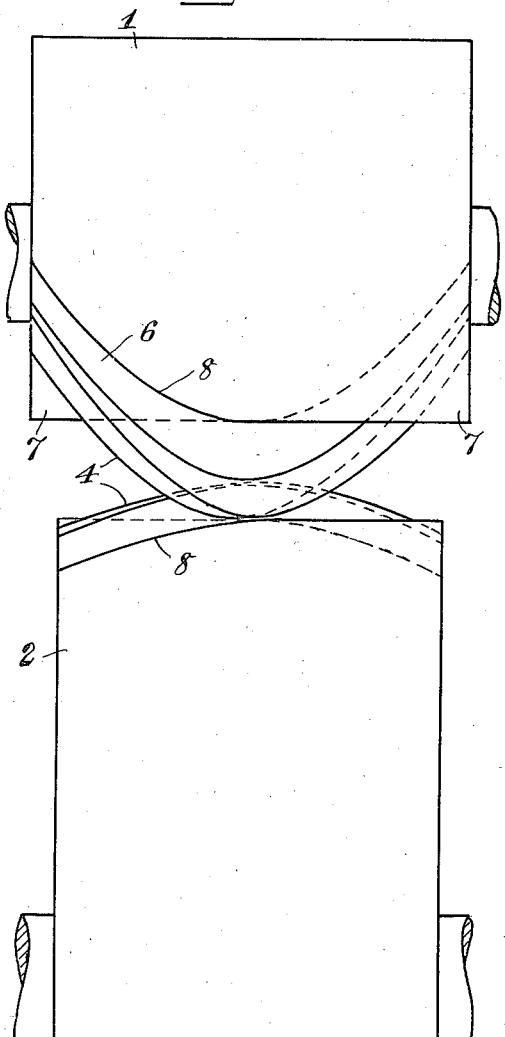

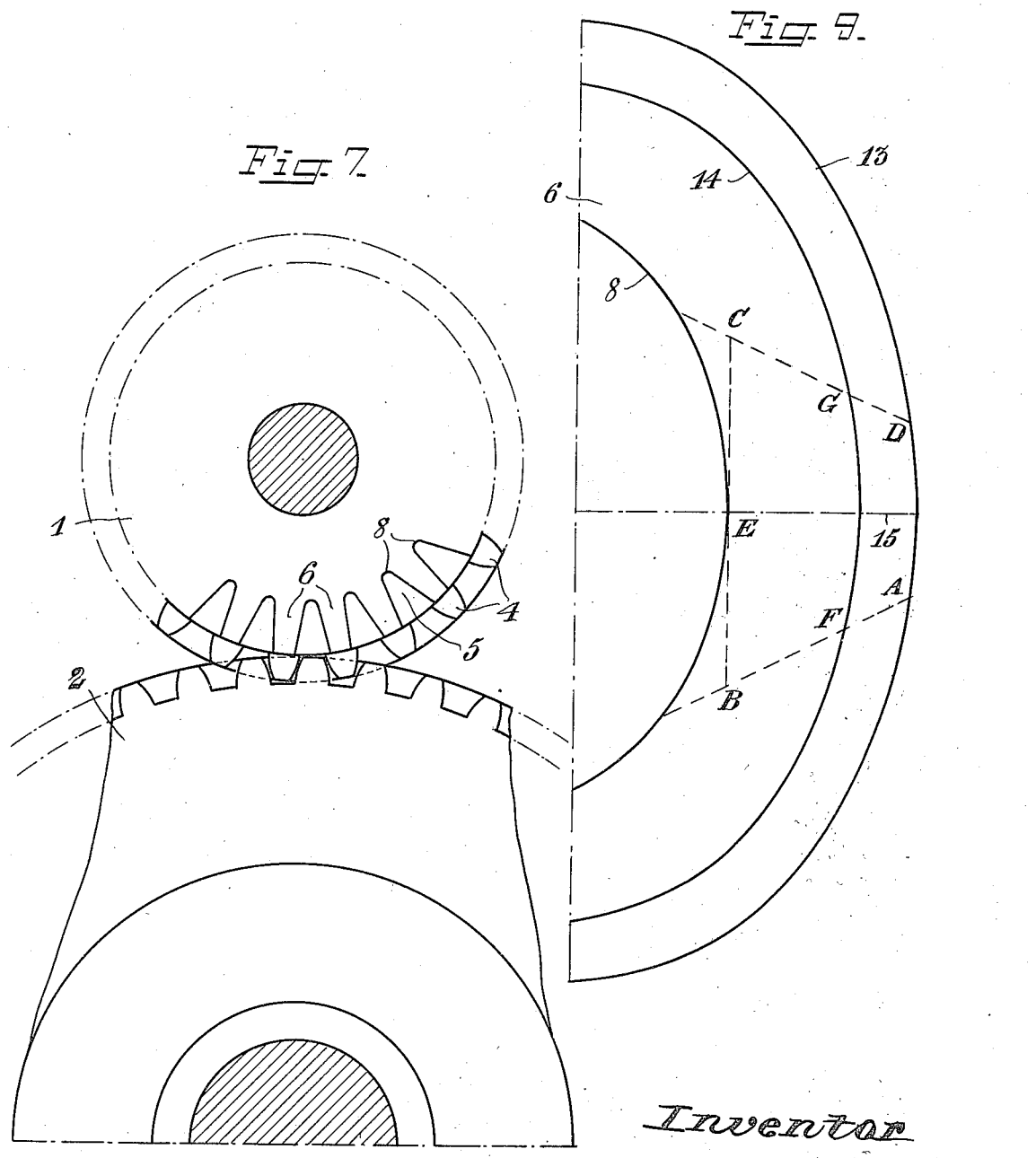

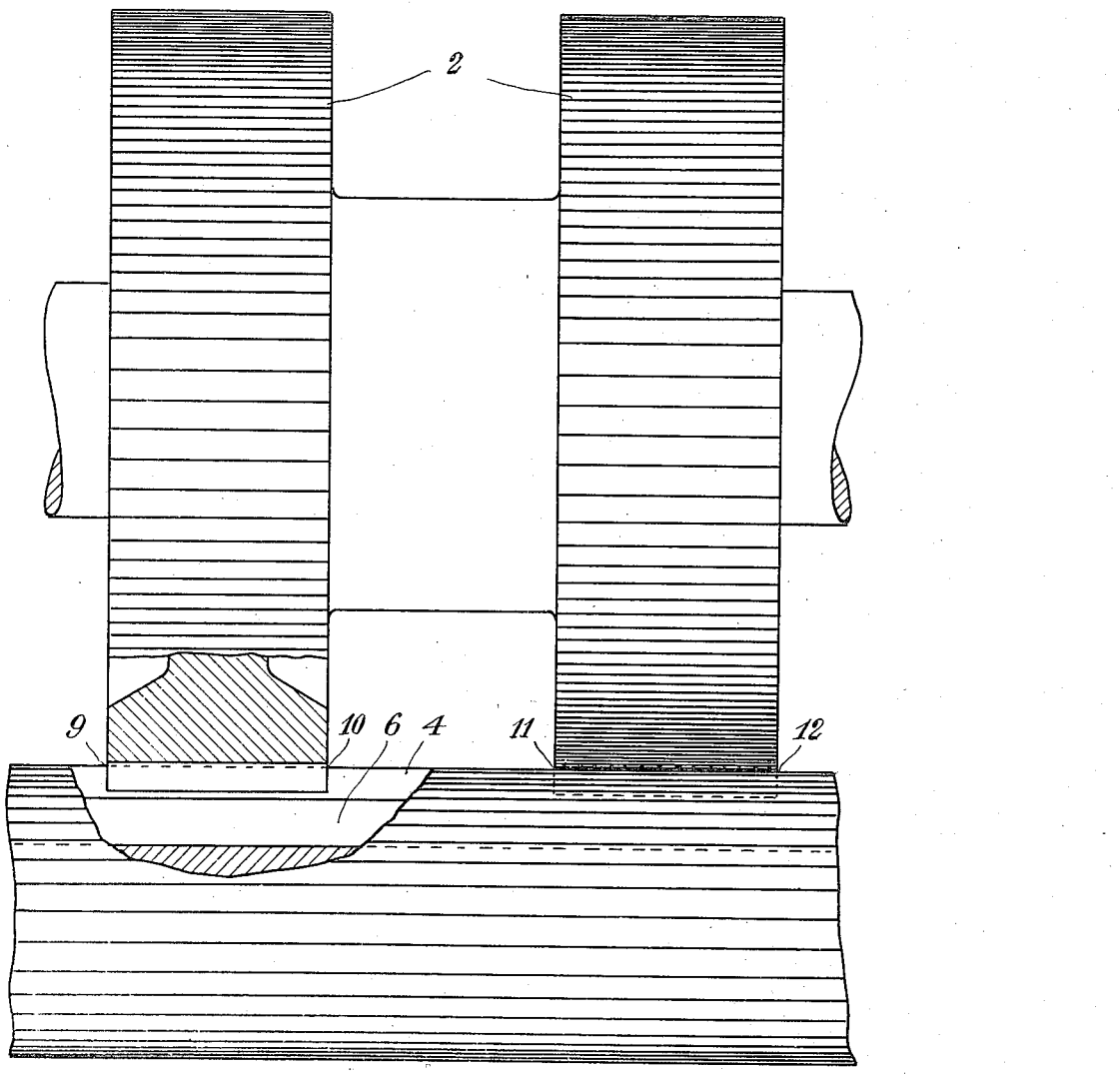

Patented Oct. 7, 1924.

1,510,895

UNITED STATES PATENT OFFICE.

FREDRIK LJUNGSTRÖM, OF BREVIK, LIDINGON, SWEDEN, ASSIGNOR TO AKTIEBOLAGET LJUNGSTRÖMS ÅNGTURBIN, OF STOCKHOLM, SWEDEN, A CORPORATION.

TOOTHED GEARING.

Application filed November 4, 1921. Serial No. 512,928.

*To all whom it may concern:*

Be it known that I, FREDRIK LJUNGSTRÖM, a subject of the King of Sweden, residing at Brevik, Lidingon, Sweden, have invented certain new and useful Improvements in Toothed Gearing (for which I have filed an application in Sweden, No. 4819/20, September 28th, 1920), of which the following is a specification.

This invention relates to toothed gearings in which the one wheel or both wheels are provided with tooth spaces deeper than those in the normal tooth-profile, the crowns of tooth being supported by roots.

The feature substantially characterizing the invention consists in that the crowns or the roots of tooth or both on the one wheel are axially extended beyond the surfaces of contact of the teeth.

Several embodiments of the invention are illustrated in the accompanying drawings in which—

Figure 1:
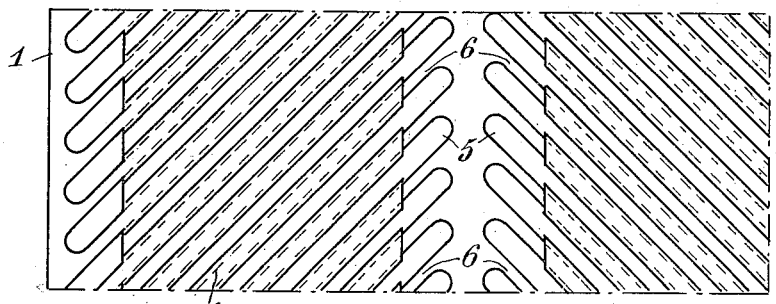
Figure 2:
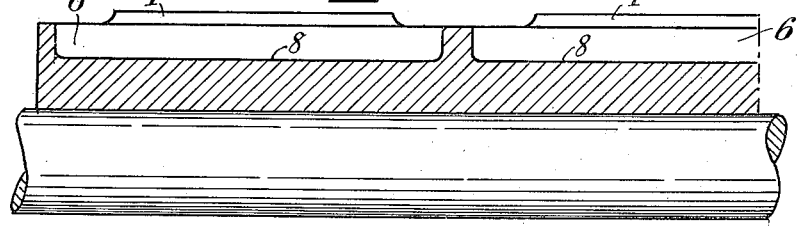
Figure 3:
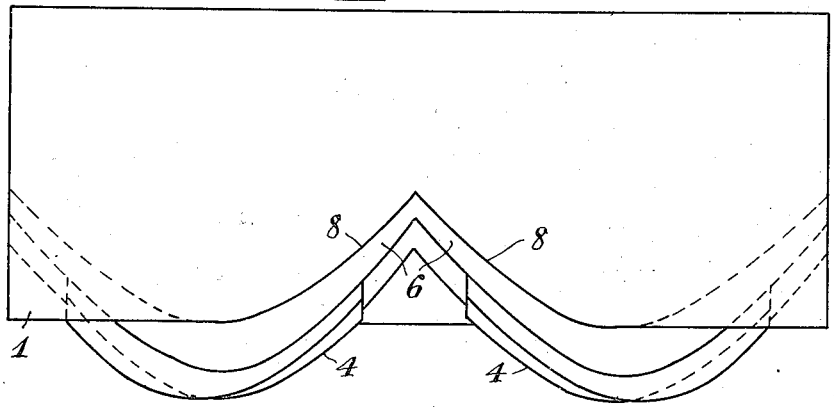
Figure 4:
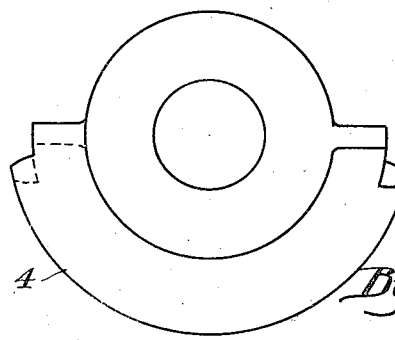

Fig. 1 shows a double wheel constructed according to the invention and extended in a plane. Fig. 2 is an axial section of one portion of the wheel. Fig. 3 is a view of the wheel at right angles to the shaft, only one tooth being represented on either part of the wheel. Fig. 4 is an axial view of the wheel. Figs. 5 and 6 show different embodiments of teeth and tooth spaces. Figs. 7 and 8 illustrate other embodiments of toothed wheels constructed according to the invention. Fig. 9 is a diagrammatic view of a portion of a spiral cut tooth viewed in the direction of the wheel shaft.

Referring to the drawings, 4 denotes the crowns of tooth, 5 the spaces between the teeth being of greater depth than in the normal tooth profile, 6 the roots of tooth and 8 the bottoms of the spaces of tooth.

In the embodiments of the invention shown in Figs. 1 to 7 it is supposed that the wheels of the toothed gearing are for instance provided with spiral cut teeth. According to the invention the crowns or the roots of the teeth, or both, on the one wheel are extended axially beyond the contact surfaces of the teeth. As shown in Figs. 2, 3 and 5, such an extension is made only on the roots of tooth 6 of the one wheel 1, whereas according to Fig. 6 the crowns 4 as well as the roots 6 are extended in the said manner. Said extensions are continued in axial side extensions 7 of the one wheel 1, the teeth and roots of teeth of the other wheel 2 being supposed to possess a length corresponding to the contact surfaces. The wheel shown in Figs. 1 to 4 is besides characterized by the wheel being formed, so to say, by two connected wheels, each provided with a group of teeth. As shown in Fig. 1, said groups of teeth are set to an angle in relation to one another.

In the embodiment illustrated in Fig. 7 only the wheel 1, which, as the wheels 1 in the other figures, preferably is the driving wheel, the wheel 2 being the driven wheel, is provided with teeth of the above-named type, whereas the wheel 2 has teeth of the normal type. Also these wheels are supposed to be provided with spiral cut teeth, and the crowns or the roots, or both, of the wheel 1 may be extended as mentioned above.

Fig. 8 illustrates an embodiment in which the wheels are provided with straight teeth. In the wheel 1, which is supposed to be the driving wheel, the teeth, as described above, consists of crowns of tooth 4 and roots of tooth 6 separated by deep spaces having bottoms 8, whereas the wheel 2 is provided with teeth of normal type. As will appear from the figure, the wheel 1 is formed as a double wheel, the crowns and the roots of the teeth being extended axially beyond the contacting surfaces co-operating with the wheel 2, that is to say, beyond the points 9 and 12 as well as between the points 10 and 11. The wheels may also be provided with spiral cut teeth, and the wheel 1 may for instance be arranged as the wheel shown in Figs. 1 to 4.

The advantage obtained by the present invention consists in that the preferably driving wheel provided with the extended crowns of teeth or roots of teeth will be of equal strength on all contact surfaces of the teeth, since a pressure at pitch-line exerted at the side surfaces of the driven wheel is equalized at both sides of the driving tooth in the longitudinal direction of the latter.

In case of spiral cut teeth also another advantage is obtained. In the portion of a spiral cut tooth shown to a greater scale in Fig. 9 and viewed in axial direction, 13 designates the one working surface of the crown of a tooth and 14 a shoulder between the crown and the root. 8 indicates the bottom of the tooth space. Powers actuating the tooth for instance at the point 15 are distributed over a greater surface on account of the deflection occurring in teeth of the type in question upon the transmission of power, which, as has been proved by experiments, is of a very great advantage in sections on lines A—F—B, B—E—C and D—G—C. This advantage is especially prominent in wheels having spiral cut teeth, since in such case a greater number of teeth of the one wheel is in engagement with teeth of the other wheel, the teeth adjusting themselves on account of the deflection in such manner that an equal pressure on the tooth is effected at all points of the contacting surfaces.

The invention may of course be applied also to the driven wheel. It is, however, of the greatest advantage that the driving, usually minor wheel be provided with the deepened spaces between the teeth and the extended teeth, which in view of the manufacture is more advantageous, because of the minor wheel possessing a minor number of teeth and usually being manufactured of a harder material.

What I claim as new and desire to secure by Letters Patent of the United States is:—

1. In a toothed gearing, a plurality of meshing gear wheels, one of said wheels being provided with spaces between the teeth deeper than those between teeth of normal profile and forming roots supporting the crowns of the teeth said roots being axially extended beyond the working surface proper of the teeth, the extensions of the roots having the same peripheral width as the roots themselves.

2. In a toothed gearing, a plurality of spirally cut gear wheels meshing with each other, one of said wheels being provided with spaces between the teeth deeper than those between teeth of normal profile and forming roots supporting the crowns of the teeth, said roots being axially extended beyond the working surface proper of the teeth, the extensions of the roots having the same peripheral width as the roots themselves.

3. In a toothed gearing, a plurality of meshing gear wheels, one of said wheels being provided with spaces between the teeth deeper than those between teeth of normal profile, the teeth thus formed being axially extended beyond their working surfaces proper, the extension of the teeth having the same profile as the teeth themselves.

4. In a toothed gearing, a small gear wheel and a large gear wheel, meshing with said small gear wheel which latter is provided with spaces between the teeth deeper than those between teeth of normal profile and forming roots supporting the crowns of the teeth, said roots being axially extended beyond the working surface proper of the teeth, the extensions of the roots having the same peripheral width as the roots themselves.

5. In a toothed gearing, a plurality of meshing gear wheels, one of said wheels being provided with groups of teeth set at an angle relatively to one another, the spaces between the teeth being deeper than those between teeth of normal profile and forming roots supporting the crowns of the teeth, said roots being axially extended beyond the working surface proper of the teeth, the extensions of the roots having the same peripheral width as the roots themselves.

In testimony whereof I affix my signature in presence of two witnesses.

FREDRIK LJUNGSTRÖM.

Witnesses:
INEZ SWENSON,
ERIC HOTGE.